US012022600B2

(12) United States Patent
Cho et al.

(10) Patent No.: US 12,022,600 B2
(45) Date of Patent: Jun. 25, 2024

(54) PLASMA TORCH

(71) Applicant: Korea Hydro & Nuclear Power Co., Ltd, Gyeongsangbuk-do (KR)

(72) Inventors: Hyun-Je Cho, Daejeon (KR); Cheon-Woo Kim, Daejeon (KR)

(73) Assignee: Korea Hydro & Nuclear Power Co., Ltd., Gyeongsangbuk-do (KR)

( * ) Notice: Subject to any disclaimer, the term of this patent is extended or adjusted under 35 U.S.C. 154(b) by 0 days.

(21) Appl. No.: 17/761,500

(22) PCT Filed: Oct. 2, 2019

(86) PCT No.: PCT/KR2019/012927

§ 371 (c)(1),
(2) Date: Mar. 17, 2022

(87) PCT Pub. No.: WO2021/066225

PCT Pub. Date: Apr. 8, 2021

(65) Prior Publication Data

US 2022/0322514 A1 Oct. 6, 2022

(51) Int. Cl.
*H05H 1/28* (2006.01)

(52) U.S. Cl.
CPC .................................... *H05H 1/28* (2013.01)

(58) Field of Classification Search
CPC ............................... H05H 1/28; H05H 1/3452
See application file for complete search history.

(56) References Cited

U.S. PATENT DOCUMENTS 3,309,550 A 3/1967 Wolf et al.
9,718,131 B2 8/2017 Boulos et al.
2005/0082263 A1* 4/2005 Koike .................. H05H 1/3423 219/121.49
2005/0284374 A1* 12/2005 Miebach .................. H05H 1/34 118/723 E (Continued)

FOREIGN PATENT DOCUMENTS

EP 3383145 B1 6/2019
FR 1376216 A 10/1964

(Continued)

OTHER PUBLICATIONS

Translation of JP-06201513-A (Year: 1994).*
Translation of JP-06226115-A (Year: 1994).*
Translation of KR-20180061967-A (Year: 2018).*

*Primary Examiner* — Elizabeth M Kerr
(74) *Attorney, Agent, or Firm* — Standley Law Group LLP; James L. Kwak; Kenny W. Pung

(57) ABSTRACT

A plasma torch has a torch body provided with a plurality of stacked torch body segments disposed between a rear electrode unit and a front electrode unit. The torch body forms a circular channel through which gas flows in an axial direction. Each torch body segment has a circular disc shape in which a central circular through-hole is formed to form the channel. Each segment includes gas supply ports defining a spiral-shaped flow path along the through hole on a first side of the segment so as to introduce a reactive gas, a cooling flow path, a cooling water supply flow path, a cooling water discharge flow path, a gas supply flow path, a gas branch flow path, a cooling water supply branch flow path, and a cooling water discharge branch flow path.

4 Claims, 4 Drawing Sheets

(56) References Cited

U.S. PATENT DOCUMENTS

| | | | |
|---|---|---|---|
| 2019/0289708 A1 | 9/2019 | Cho et al. | |

FOREIGN PATENT DOCUMENTS

| | | | | |
|---|---|---|---|---|
| JP | 6-201513 A | | 7/1994 |
| JP | 06201513 A | * | 7/1994 |
| JP | 6-226115 A | | 8/1994 |
| JP | 06226115 A | * | 8/1994 |
| KR | 10-2007-0025139 A | | 3/2007 |
| KR | 20180061967 A | | 6/2008 |
| KR | 10-1041887 B1 | | 6/2011 |
| KR | 10-1616487 B1 | | 4/2016 |
| KR | 20180061967 A | * | 6/2018 |

* cited by examiner

PLASMA TORCH

TECHNICAL FIELD

The present disclosure relates to a plasma torch. More particularly, the present disclosure relates to a plasma torch capable of stably generating plasma with high power (MW class).

BACKGROUND ART

In order to melt non-combustible waste such as metal, concrete, and the like by using a plasma torch melting furnace, it is very important to operate a plasma torch that is capable of stably generating plasma with high power.

Generally, in the plasma torch, an internal electrode is formed in a hollow-type, and plasma is generated by introducing a gas such as nitrogen, argon, and the like into a center portion of the internal electrode. On an outside of the electrode, a cooling flow path is formed, so that damaging of a material of the electrode caused by plasma discharging and by a high temperature is minimized and a performance of the electrode is maintained, thereby stably managing the plasma torch.

However, a plasma torch in a hollow-type, a rod-type, or a button-type has an inner portion thereof provided with a simple cooling passage and a simple gas inlet passage, and cooling water or gas is supplied from single place, so that cooling of the electrode performed by a cooling temperature deviation is not constant. Further, since a gas flow rate is not constant, there is a disadvantage that a plasma arc oscillation is severely generated.

In this situation, instability in operation variables may occur during a melting process of waste, so that difficulty in facility stability may occur. Further, in a plasma torch in a normal hollow-type and a plasma torch in a normal button-type, since a length of an arc is decreased when current is increased, the gas flow rate is required to be increased, so that the enthalpy is relatively low. In addition, since electrical insulation between a front electrode and a torch body is difficult and it is difficult to fix a cathode spot, abnormal arcing may easily occur during performing reversed polarity operation and it is difficult to perform reversed polarity operation with MW class high power.

DOCUMENT OF RELATED ART

Patent Document (Patent Document 1) Korean Patent Application Publication No. 10-2007-0025139 (published on Mar. 8, 2007)
(Patent Document 2) Korean Patent No. 10-1616487 (published on Apr. 28, 2016)

DISCLOSURE

Technical Problem

Accordingly, the present disclosure has been made keeping in mind the above problems occurring in the related art, and an objective of the present disclosure is to provide a plasma torch capable of stably generating plasma with high power (MW class) by using an electrode body portion having a multi-plate structure formed of unit segments in which each of cooling flow path and a gas flow path is provided.

Technical Solution

In order to achieve the above objective, there is provided a plasma torch including: a rear electrode unit; a front electrode unit; a nozzle unit which is provided on the front electrode unit and through which a plasma gas is discharged; and a torch body having a cylindrical shape and formed of a plurality of stacked segments, the plurality of stacked segments being disposed between the rear electrode unit and the front electrode unit and forming a circular channel through which gas flows in an axial direction C, wherein each of the segments is formed in a circular disc shape having a circular through-hole that forms the channel on a center of the segment, and comprises: a plurality of gas supply ports formed in a spiral shape on a first surface of each of the segments along the through-hole so as to form a flow path such that a reactive gas is introduced into the plurality of gas supply ports; a cooling flow path which has a flow path formed so as to surround the through-hole and through which cooling water flows; a cooling water supply flow path vertically penetrating each of the segments, thereby forming a flow path for supplying the cooling water; a cooling water discharge flow path vertically penetrating each of the segments, thereby forming a flow path for discharging the cooling water; a gas supply flow path vertically penetrating each of the segments, thereby forming a flow path for supplying a discharge gas; a gas branch flow path branched from the gas supply flow path and connected to the plurality of gas supply ports; a cooling water supply branch flow path branched from the cooling water supply flow path and connected to the cooling flow path; and a cooling water discharge branch flow path branched from the cooling flow path and connected to the cooling water discharge flow path.

Preferably, each of the segments may further include a cooling block formed of copper, the cooling block having a body portion formed in a ring shape such that the through-hole is formed, and the cooling block having the cooling flow path by formed being recessed from an outer circumferential surface of the body portion.

Preferably, the first surface of each of the segments, which is provided with the plurality of gas supply ports, may have a sealing surface having a step and recessed in an outside of the plurality of gas supply ports, and a discharge hole as an opening portion of the gas branch flow path may be formed on the sealing surface.

More preferably, a sealing member may be provided on the sealing surface outside the discharge hole such that a space between the adjacent segments is airtightly sealed.

Preferably, at least one of the cooling water supply flow path, the cooling water discharge flow path, and the gas supply flow path may be in plurality provided on each of the segments, and the torch body may be divided into at least two sections depending on a length of the torch body, and the plurality of the cooling water supply flow path, the cooling water discharge flow path, and the gas supply flow path may be respectively and optionally connected to the gas branch flow path, the cooling water supply branch flow path, or the cooling water discharge branch flow path, for each of the sections.

Advantageous Effects

According to the plasma torch of the present disclosure, the touch body formed of the plurality of segments formed in a disc shape is provided between the front electrode unit and the rear electrode unit, and each of the segments is individually provided with the flow path for the discharge gas and the cooling flow path capable of circulating the cooling water. Therefore, since constant amount of the discharge gas may be provided in each of the segments and stable cooling may be performed, thermal load transferred from an arc column at a high temperature at least MW class of power is dispersed and thermal load concentrated on one position is efficiently removed so that abnormal discharging may be prevented and plasma may be stably generated, and operation stability of the plasma torch may be realized since it is easy to switch operation mode of the plasma torch.

BEST MODE

Specific structures and functions stated in the following embodiments of the present disclosure are exemplified to illustrate embodiments according to the spirit of the present disclosure and the embodiments according to the spirit of the present disclosure can be achieved in various ways. Further, the present disclosure should not be construed as being limited to the following embodiments and should be construed as including all changes, equivalents, and replacements included in the spirit and scope of the present disclosure.

Further, in the present disclosure, terms including “first” and/or “second” may be used to describe various components, but the components are not limited to the terms. The terms are used to distinguish one component from another component, and for instance, a first component may be referred to as a second component, and similarly, a second component may be referred to as a first component without departing from the scope according to the spirit of the present disclosure.

It should be understood that when one element is referred to as being “connected to” or “coupled to” another element, it may be connected directly to or coupled directly to another element or be connected to or coupled to another element, having the other element intervening therebetween. On the other hand, it is to be understood that when one element is referred to as being “connected directly to” or “in contact directly with” another element, it may be connected to or coupled to another element without the other element intervening therebetween. Expressions for describing relationships between components, that is, “between”, “directly between”, “adjacent to”, and “directly adjacent to” should be construed in the same way.

Terms used in the present specification are used only in order to describe specific exemplary embodiments rather than limiting the present invention. As used herein, the singular forms are intended to include the plural forms as well, unless the context clearly indicates otherwise. It will be further understood that the terms “comprises” or “have” used in this specification, specify the presence of stated features, steps, operations, components, parts, or a combination thereof, but do not preclude the presence or addition of one or more other features, numerals, steps, operations, components, parts, or a combination thereof.

Hereinafter, an embodiment of the present disclosure will be described in detail with reference to the accompanying drawings, and a description of a known configuration of a plasma torch will be omitted and a main configuration of a plasma torch in an embodiment of the present disclosure will be mainly described.

Figure 1:
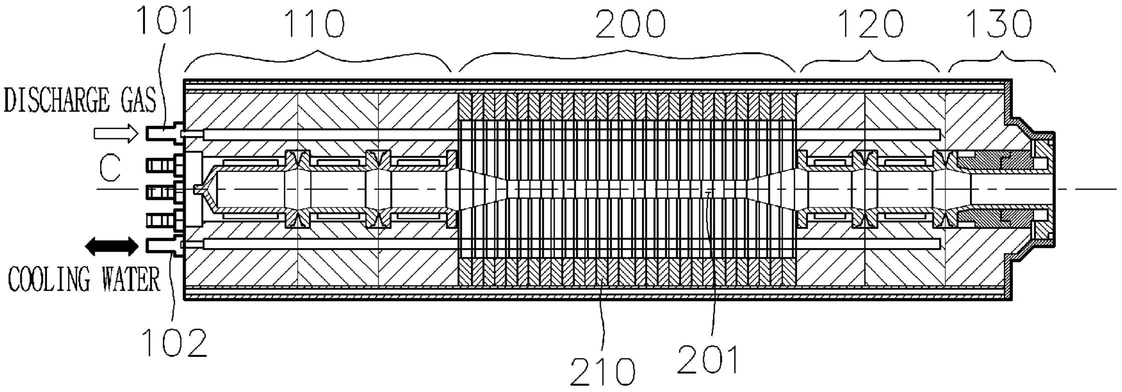
FIG. 1 is a cross-sectional view illustrating a configuration of a plasma torch according to an embodiment of the present disclosure.

FIG. 1 is a cross-sectional view illustrating a configuration of a plasma torch according to an embodiment of the present disclosure.

Referring to FIG. 1, the plasma torch according to an embodiment of the present disclosure includes: a rear electrode unit 110; a front electrode unit 120; a nozzle unit 130; and a torch body 200 including a plurality of segments 210 which is stacked in a multi-plate structure and which is provided between the rear electrode unit 110 and the front electrode unit 120.

The front electrode unit 120 and the rear electrode unit 110 are electrically connected to a cathode or an anode, respectively, and power is supplied thereto. The rear electrode unit 110 may include a hollow-type electrode in which a first end thereof is closed, and may further include an auxiliary electrode unit electrically connected to the cathode or the anode separately. The nozzle unit 130 through which a high temperature plasma gas is discharged is provided on a front end of the front electrode unit 120.

Each electrode is electrically insulated and is accommodated in a housing.

Particularly, in the present disclosure, the torch body 200 is provided with a circular channel 201 through which gas flows in an axial direction C, and has the multi-plate structure in which the unit segments 210 are airtightly stacked on each other.

A gas supply pipe 101 configured to supply a discharge gas (for example, nitrogen) and a cooling water pipe 102 configured to circulate a cooling water are connected to a rear end of the rear electrode unit 110. For reference, in FIG. 1, the cooling water pipe 102 is exemplified as one, but may be configured such that a cooling water supply pipe into which the cooling water is introduced and a cooling water discharge pipe through which the cooling water is discharged are separately provided.

Figure 2:
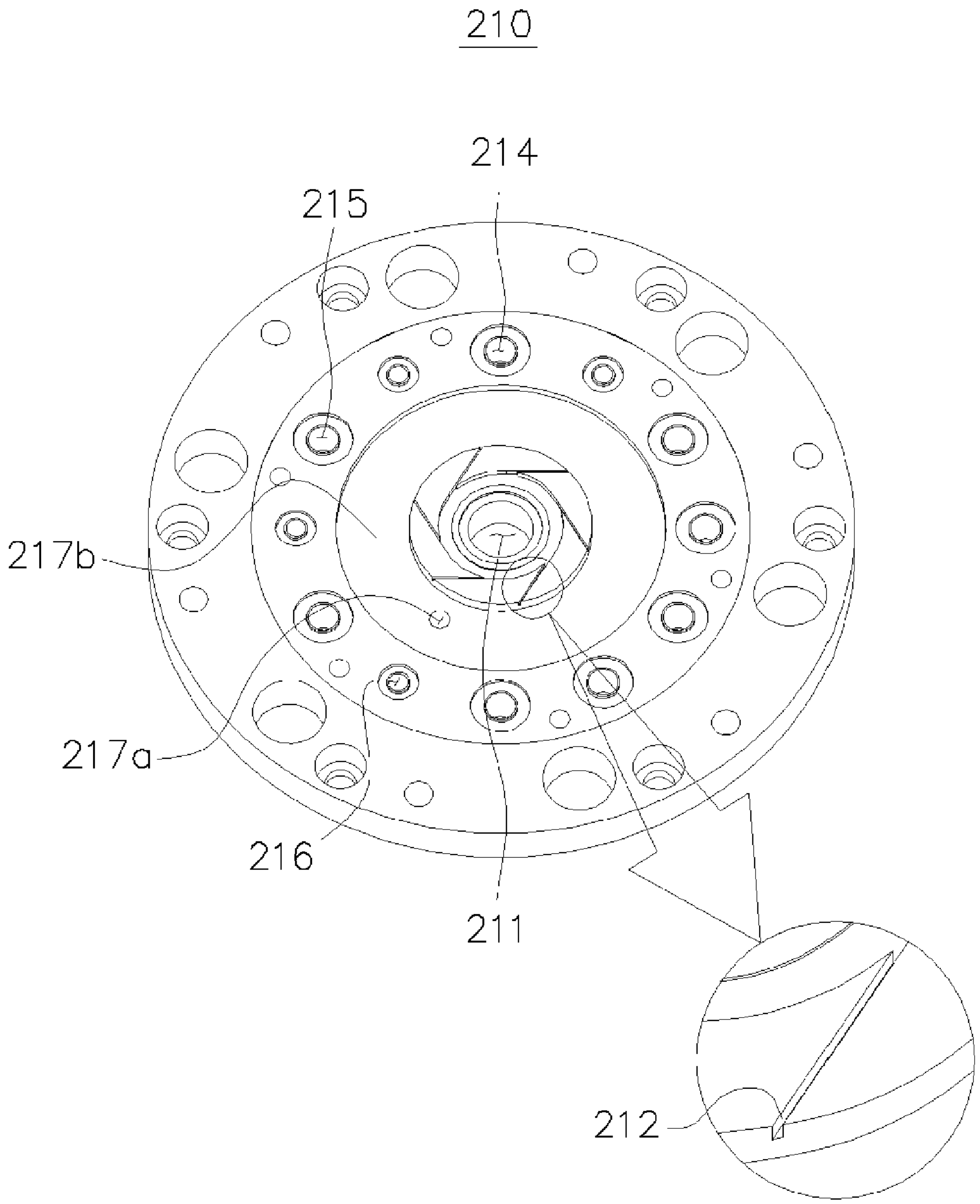
FIG. 2 is a perspective view illustrating a configuration of a segment of the plasma torch according to an embodiment of the present disclosure.
Figure 3:
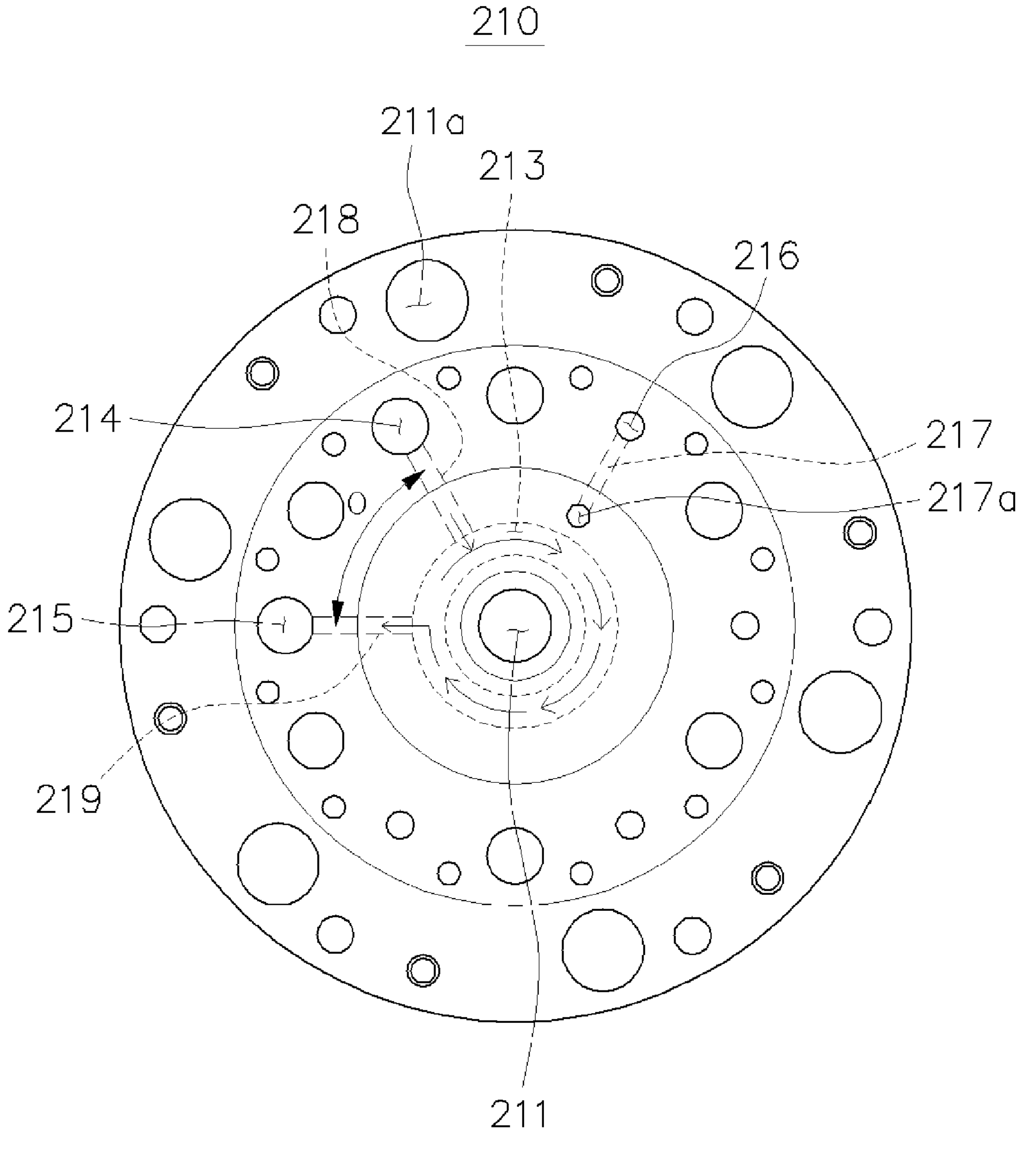
FIG. 3 is a rear view illustrating the configuration of the segment of the plasma torch according to an embodiment of the present disclosure.

FIG. 2 is a perspective view illustrating a configuration of the segment of the plasma torch according to an embodiment of the present disclosure, and FIG. 3 is a rear view illustrating the configuration of the segment of the plasma torch according to an embodiment of the present disclosure.

Referring to FIGS. 2 and 3, the segment 210 is formed in a circular disk shape having a circular through-hole 211 that forms the channel 201 on a center of the segment 210. Further, the segment 210 includes: a plurality of gas supply ports 212 formed in a spiral shape along the through-hole on a first surface of the segment 210 so as to form a flow path such that a reactive gas is introduced into the plurality of gas supply ports 212; a cooling flow path 213 which has a flow path formed so as to surround the through-hole 211 and through which the cooling water flows; a cooling water supply flow path 214 vertically penetrating the segment 210, thereby forming a flow path for supplying the cooling water; a cooling water discharge flow path 215 vertically penetrating the segment 210, thereby forming a flow path for discharging the cooling water; a gas supply flow path 216 vertically penetrating the segment 210, thereby forming a flow path for supplying the discharge gas; a gas branch flow path 217 branched from the gas supply flow path 216 so as to be connected to the gas supply port 212; a cooling water supply branch flow path 218 branched from the cooling water supply flow path 214 so as to be connected to the cooling flow path 213; and a cooling water discharge branch flow path 219 branched from the cooling flow path 213 so as to be connected to the cooling water discharge flow path 215.

Since the plurality of gas supply ports 212 is configured such that the plurality of gas supply ports 212 is formed in the spiral shape on the first surface of the segment 210 and is adjacent to the through-hole 211 such that the reactive gas is introduced thereto, the plurality of gas supply ports 212 may prevent an abnormal discharging phenomenon since an arc spot is concentrated on one position inside the gas supply port 212, and serves to push a constant arc column to a front direction.

Meanwhile, the plurality of gas supply ports 212 may be provided on a separate body formed of ceramic material, and the separate body formed of ceramic material on which the plurality of gas supply ports 212 is formed may be assembled to the adjacent segment 210 and may maintain airtightness between the segments 210 such that the discharge gas is prevented from leaking.

In each of the segments 210, the cooling water supply flow path 214, the cooling water discharge flow path 215, the gas supply flow path 216 vertically penetrate each of the segments 210. Further, the cooling water supply flow path 214, the cooling water discharge flow path 215, the gas supply flow path 216 of each of the segments 210 that configures the torch body 200 are connected to adjacent cooling water supply flow path 214, adjacent cooling water discharge flow path 215, and adjacent gas supply flow path 216 of each of the segments 210 as one flow path, respectively. Meanwhile, the cooling water supply flow path 214 and the cooling water discharge flow path 215 extend up to the front electrode unit 120 (see FIG. 1) and are in communication with each other. Therefore, the cooling water supplied through the cooling water supply pipe flows along the cooling water supply flow path 214 via the rear electrode unit 110, and is discharged from the front electrode unit 120 to the cooling water discharge pipe along the cooling water discharge flow path 215, so that the cooling water is circulated along a body of the plasma torch. In addition, the gas supply flow path 216 may also extend up to the front electrode unit 120.

The gas branch flow path 217 is provided adjacent to the plurality of gas supply ports 212 such that the gas branch flow path 217 is branched from the gas supply flow path 216 and is in communication with the plurality of gas supply ports 212. In the embodiment, a discharge hole 217*a* is formed adjacent to the plurality of gas supply ports 212, and the discharge hole 217*a* is connected to the gas supply flow path 216 via the gas branch flow path 217.

Meanwhile, the discharge hole 217*a* is positioned in a sealing surface 217*b* which is recessed in an outside of the plurality of gas supply ports 212 and which has a step. Further, a sealing member (an O-ring) is provided outside the discharge hole 217*a* of the sealing surface 217*b*, so that airtightness with the adjacent segment 210 that is assembled may be realized.

The cooling water supply branch flow path 218 is vertically branched from the cooling water supply flow path 214 and is in communication with the cooling flow path 213, and the cooling water discharge branch flow path 219 is vertically branched from the cooling water discharge flow path 215 and is in communication with the cooling flow path 213. Therefore, a portion of the cooling water that flows along the cooling water supply flow path 214 is introduced into the cooling flow path 213 along the cooling water supply branch flow path 218, and is discharged along the cooling water discharge branch flow path 219 and along the cooling water discharge flow path 215, so that a periphery of the through-hole 211 may always be maintained at a constant temperature.

Meanwhile, the cooling water supply branch flow path 218 and the cooling water discharge branch flow path 219 are respectively connected to the cooling water supply flow path 214 and the cooling water discharge flow path 215 in a radial direction from the cooling flow path 213. Therefore, in order for the cooling water that is introduced into the cooling flow path 213 to be sufficiently rotated in the cooling flow path 213 such that heat-exchanging is realized, it is preferable that an angle θ between the cooling water supply flow path 214 and the cooling water discharge flow path 215 is small, and it is preferable that the angle θ between the cooling water supply flow path 214 and the cooling water discharge flow path 215 does not exceed at least 90 degrees.

One or a plurality of other flow paths 211*a* for cooling water may be added to communicate with the front electrode unit 120, and may control a cooling state of the front electrode unit 120 by enabling the cooling water to be circulated directly through the front electrode unit 120 without being separately branched from each of the segments 210.

Meanwhile, in each of the segments 210, a plurality of cooling water supply flow path 214, a plurality of cooling water discharge flow path 215, and a plurality of gas supply flow path 216 may be provided. Accordingly, each branch flow path 217, 218, and 219 is not allocated to each flow path 214, 215, and 216, and is allocated by several sections depending on a length of the torch body 200 and each flow path 214, 215, and 216 is used by being allocated to each of the sections. Therefore, in the torch body 200 formed of many segments 210, the discharge gas and the cooling water distributed from each of the segments 210 may be constantly distributed.

Each of the segments 210 may be formed of stainless steel (SUS). Preferably, a portion of the cooling flow path 213 may be formed of a cooling block formed of copper.

Figure 4:
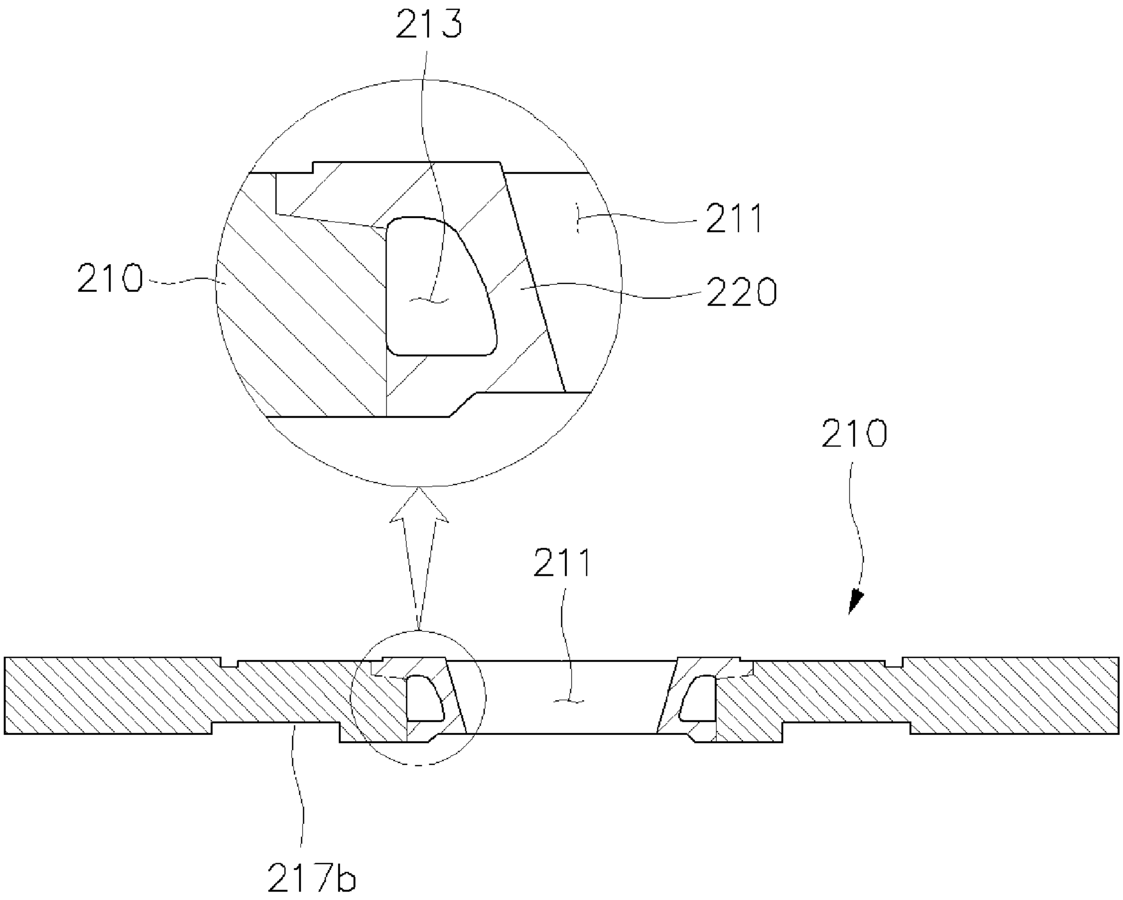
FIG. 4 is a cross-sectional view illustrating the configuration of the segment of the plasma torch according to an embodiment of the present disclosure.

FIG. 4 is a cross-sectional view illustrating the configuration of the segment of the plasma torch according to an embodiment of the present disclosure.

Referring to FIG. 4, each of the segments 210 may further include a cooling block 220 having a body portion formed in a ring shape such that the through-hole 211 is formed, the cooling block 220 forming the cooling flow path 213 by being concavely recessed inward from an outer circumferential surface of the body portion. At this time, the cooling block 220 may be formed of copper (Cu) having excellent electrical conductivity and having excellent thermal conductivity.

The specific embodiment of the present disclosure is described in detail above. However, the present disclosure is not limited to the specific embodiment. It would be apparent to a person of ordinary skill in the art that various modifications to the present disclosure are possible within the scope of the technical idea of the present disclosure.

DESCRIPTION OF REFERENCE NUMERALS

110: rear electrode unit 120: front electrode unit
130: nozzle unit 200: torch body

201: channel 210: segment
211: through-hole 212: gas supply port
213: cooling flow path 214: cooling water supply flow path
215: cooling water discharge flow path 216: gas supply flow path
217: gas branch flow path 218: cooling water supply branch flow path
219: cooling water discharge branch flow path

The invention claimed is:

1. A plasma torch comprising:
a plurality of torch body segments, each of the torch body segments having a circular disc shape with a circular through-hole that forms a channel on a center of the circular disc shape, each torch body segment further comprising:
a plurality of gas supply ports formed in a spiral shape on a first surface of each of the torch body segments along the circular through-hole, defining a flow path for introducing a reactive gas into the plurality of gas supply ports;
a cooling flow path, surrounding the circular through-hole, through which cooling water flows;
a cooling water supply flow path that vertically extends through the torch body segment, defining a flow path for supplying the cooling water;
a cooling water discharge flow path that vertically extends through the torch body segment, defining a flow path for discharging the cooling water;
a gas supply flow path that vertically penetrates the torch body segment, defining a flow path for supplying a discharge gas;
a gas branch flow path that branches from the gas supply flow path and connects to the plurality of gas supply ports;
a cooling water supply branch flow path that branches from the cooling water supply flow path and connects to the cooling flow path; and
a cooling water discharge branch flow path that branches from the cooling flow path and connects to the cooling water discharge flow path;
a rear electrode unit;
a front electrode unit;
a nozzle unit which is provided on the front electrode unit and through which a plasma gas is discharged; and
a torch body, disposed between the rear electrode unit and the front electrode unit and forming a circular channel through which gas flows in an axial direction, the torch body having a cylindrical shape and formed of a stack of the plurality of torch body segments,
wherein each of the torch body segments further comprises a cooling block, formed of copper, with a ring-shaped body portion having a recess formed on an outer circumference and the through-hole is at the center, and
wherein the cooling flow path is formed between an inner circumference of the torch body and the recess of the cooling block by fitting the cooling block into the inner circumference of the torch body.

2. The plasma torch of claim 1, wherein the first surface of each torch body segment further comprises:
a sealing surface, having a step that is recessed in an outside of the plurality of gas supply ports; and
a discharge hole, as an opening portion of the gas branch flow path, formed on the sealing surface.

3. The plasma torch of claim 2, further comprising:
a sealing member provided on the sealing surface outside the discharge hole such that a space between the adjacent segments is sealed in an air-tight manner.

4. The plasma torch of claim 1, wherein:
the torch body is divided into at least two sections;
a plurality is provided on each torch body segment of at least one of: the cooling water supply flow path, the cooling water discharge flow path, and the gas supply flow path; and
the flow paths provided in plurality are optionally connected to the respective branch flow paths for each of the torch body sections.

* * * * *